(12) United States Patent
Yao

(10) Patent No.: US 12,264,777 B2
(45) Date of Patent: Apr. 1, 2025

(54) FLEXIBLE MOBILE HOLDER

(71) Applicant: Shenzhen Rehai Technology Co., Ltd., Guangdong (CN)

(72) Inventor: Xiaosheng Yao, Shenzhen (CN)

(73) Assignee: SHENZHEN REHAI TECHNOLOGY CO., LTD., Guangdong (CN)

( * ) Notice: Subject to any disclaimer, the term of this patent is extended or adjusted under 35 U.S.C. 154(b) by 48 days.

(21) Appl. No.: 18/489,861

(22) Filed: Oct. 19, 2023

(65) Prior Publication Data
US 2024/0175542 A1 May 30, 2024

(30) Foreign Application Priority Data
Nov. 28, 2022 (CN) .......................... 202223153774.7

(51) Int. Cl.
*F16M 13/02* (2006.01)
(52) U.S. Cl.
CPC ..... *F16M 13/022* (2013.01); *F16M 2200/025* (2013.01)
(58) Field of Classification Search
CPC ........................ F16M 13/022; F16M 2200/025
USPC ....................................... 248/455; 455/575.1
See application file for complete search history.

(56) References Cited

U.S. PATENT DOCUMENTS

| | | | | |
|---|---|---|---|---|
| 5,823,657 A * | 10/1998 | Price | ................... | F16M 13/022 |
| | | | | 362/396 |
| 5,842,671 A * | 12/1998 | Gibbs | ................ | F16M 11/2014 |
| | | | | 248/311.2 |
| 6,299,117 B1 * | 10/2001 | Lin | ...................... | F16M 13/022 |
| | | | | 24/135 R |
| 7,387,285 B2 * | 6/2008 | Thomason | ............. | A47D 15/00 |
| | | | | 248/222.12 |
| 11,054,062 B2 * | 7/2021 | Hung | ..................... | H02G 11/00 |
| 11,350,748 B2 * | 6/2022 | Ediger | .................. | F04D 29/646 |
| 2019/0295446 A1 * | 9/2019 | Hung | ................... | F16M 13/022 |
| 2022/0082206 A1 * | 3/2022 | Walker | .................... | F16M 11/18 |
| 2023/0344926 A1 * | 10/2023 | Thaniel | .................. | F16M 11/12 |
| 2024/0301993 A1 * | 9/2024 | Cai | ......................... | H04M 1/04 |

* cited by examiner

*Primary Examiner* — Todd M Epps
(74) *Attorney, Agent, or Firm* — Leong C. Lei

(57) ABSTRACT

A flexible mobile holder includes a base assembly, a support rod, and a clamping assembly for clamping an electronic product. One end of the support rod is connected to the base assembly. The clamping assembly is connected to another end of the support rod. The base assembly includes an upright post, a clamping mechanism, and a movable seat. An upper end of the upright post has a mounting hole. A plurality of first positioning teeth are provided on an inner wall of one end of the mounting hole. The clamping mechanism is disposed at a lower end of the upright post.

10 Claims, 6 Drawing Sheets

FLEXIBLE MOBILE HOLDER

BACKGROUND OF THE INVENTION

1. Field of the Invention

The present invention relates to a holder, and more particularly to a flexible mobile holder

2. Description of the Prior Art

A flexible mobile holder is designed according to different digital products, such as tablet computers, mobile phones and the like, used for supporting such digital products. The main purpose of the flexible mobile holder is to provide comfort and prevent people from suffering from cervical spondylosis. The flexible mobile holder is based on ergonomics and the human-machine design concept, allowing users to use digital products in a more comfortable way. The flexible mobile holder is a simple and easy-to-use digital holder that can be used in the most comfortable way. It pays attention to user experience and excellent structural design. Based on ergonomics and the man-machine design concept, users can get a better user experience.

A conventional flexible mobile holder comprises a base assembly, a support rod, and a clamping assembly for clamping an electronic product. The support rod is a flexible tube. One end of the support rod is connected to the base assembly. The clamping assembly is connected to another end of the support rod. When in use, the base assembly is fixedly connected to an external table edge or fixing rod. Then, the electronic product is secured on the clamping assembly. The height and angle of the electronic product can be adjusted by manually pulling the clamping assembly to deform the support rod.

However, in the prior art, the support rod of the flexible mobile holder is fixed as a whole relative to the base assembly and cannot be adjusted in angle. The angle change of the electronic product only relies on the twisting and deformation of the support rod. The adjustable angle range is small, which cannot meet the needs of use. Therefore, it is necessary to improve the conventional flexible mobile holder.

SUMMARY OF THE INVENTION

The primary object of the present invention is to provide a flexible mobile holder, which can overcome the deficiencies of the prior art.

In order to achieve the foregoing object, the present invention adopts the following solutions.

A flexible mobile holder comprises a base assembly, a support rod, and a clamping assembly for clamping an electronic product. One end of the support rod is connected to the base assembly. The clamping assembly is connected to another end of the support rod. The base assembly includes an upright post, a clamping mechanism, and a movable seat. An upper end of the upright post has a mounting hole. A plurality of first positioning teeth are provided on an inner wall of one end of the mounting hole. The clamping mechanism is disposed at a lower end of the upright post. The movable seat is movable up and down and is rotatably disposed in the mounting hole. An outer wall of the movable seat is formed with a plurality of second positioning teeth meshing with the first positioning teeth for rotational restriction. The movable seat has an elastic arm that is in tight fit with the inner wall of the mounting hole.

Compared with the prior art, the present invention has obvious advantages and beneficial effects. Specifically, it can be known from the above technical solutions:

In the present invention, the movable seat can be moved up and down and is rotatably disposed in the mounting hole, and the support rod is fixed to the movable seat, so that the support rod can be rotated and adjusted at any angle. Besides, the second positioning teeth mesh with the first positioning teeth for rotational restriction, such that the support rod can be positioned at any angle. There is no need to rely on the twisting and deformation of the support rod for adjusting an angle. The adjustable angle range is large, meeting the needs of use. It is convenient for use.

DETAILED DESCRIPTION OF THE PREFERRED EMBODIMENTS

Embodiments of the present invention will now be described, by way of example only, with reference to the accompanying drawings.

Figure 1:
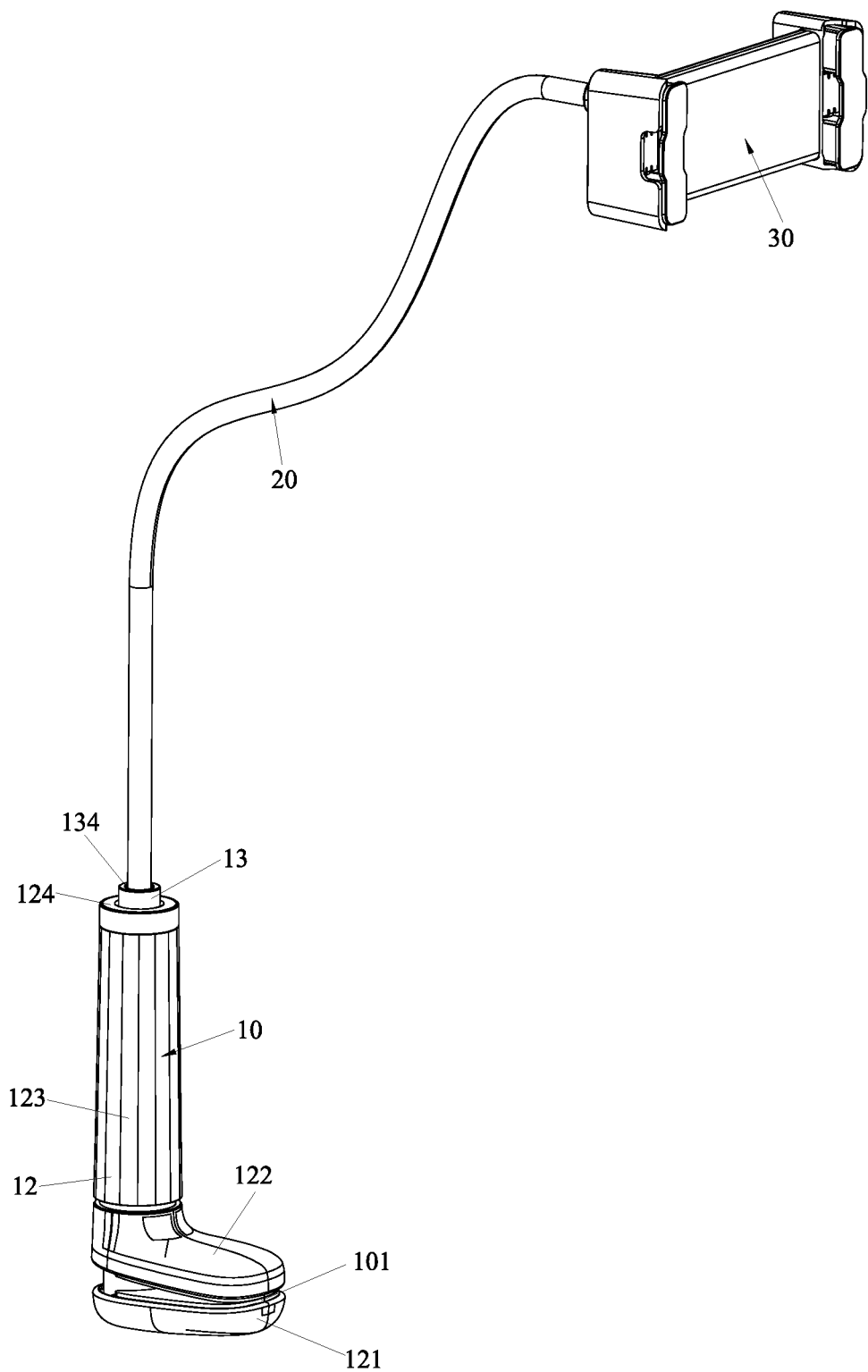
FIG. 1 is a perspective view of the flexible mobile holder provided by the present invention.
Figure 2:
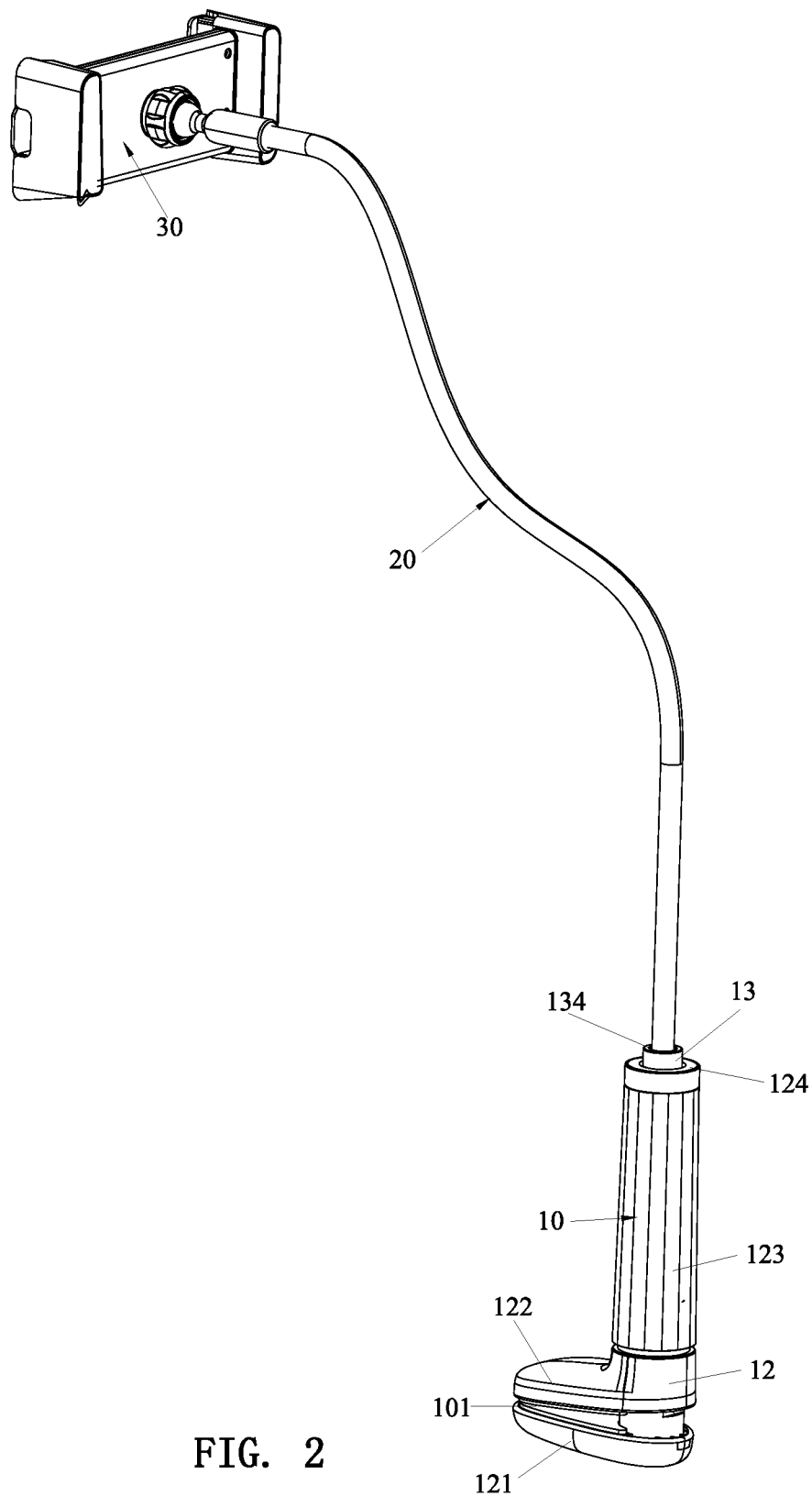
FIG. 2 is another perspective view of the flexible mobile holder shown in FIG. 1.
Figure 3:
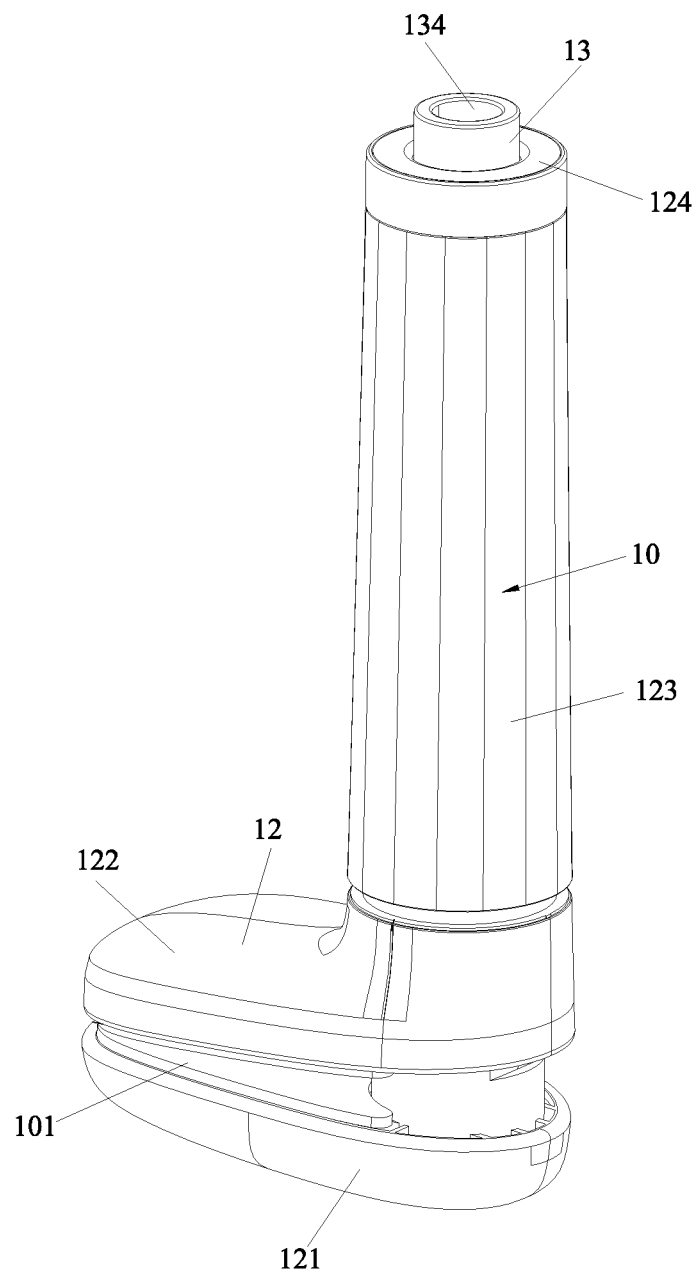
FIG. 3 is an enlarged view of the base assembly of the flexible mobile holder provided by the present invention.
Figure 4:
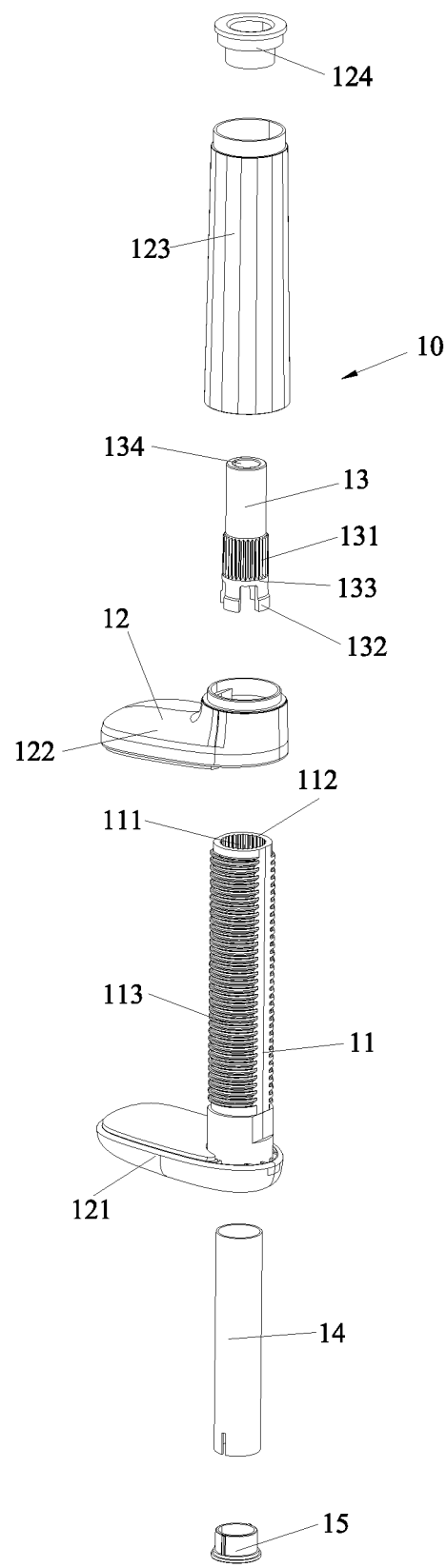
FIG. 4 is an exploded view of the base assembly shown in FIG. 3.
Figure 5:
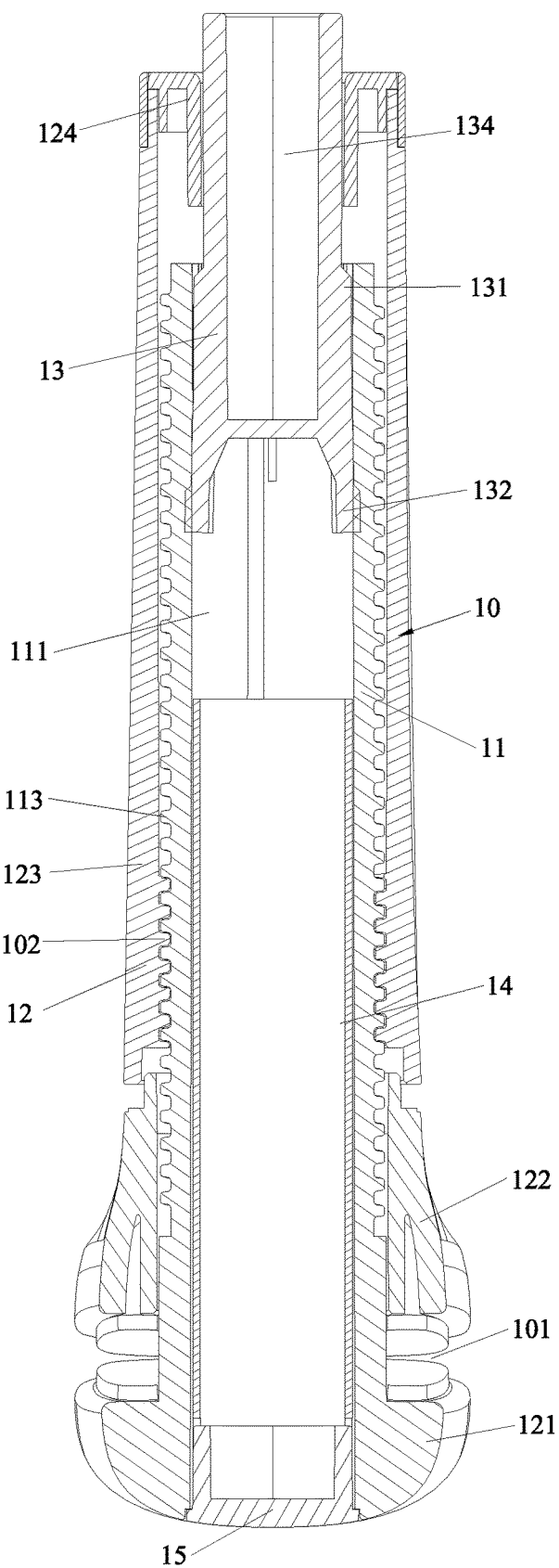
FIG. 5 is a cross-sectional view of the base assembly shown in FIG. 3.
Figure 6:
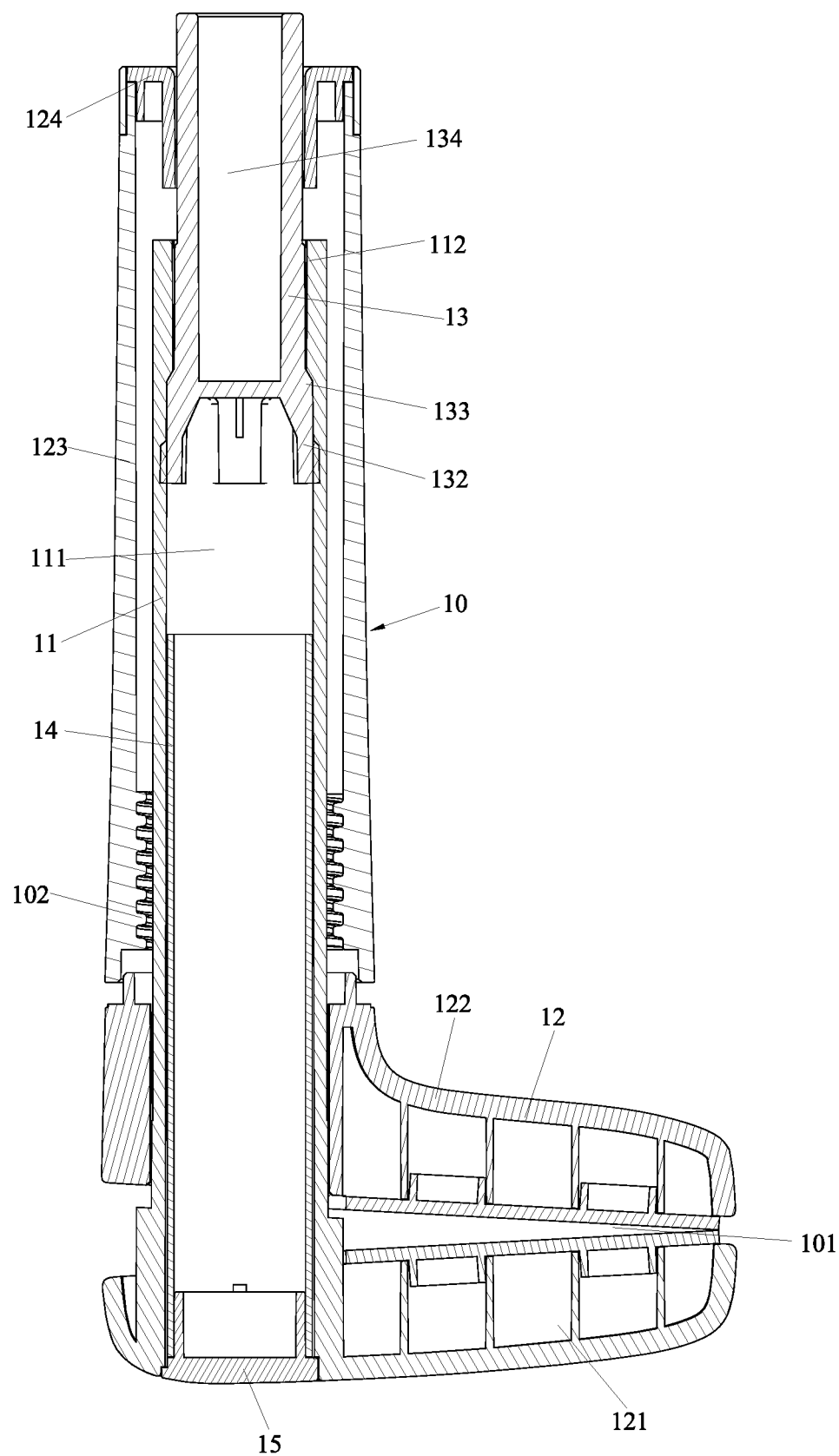
FIG. 6 is another cross-sectional view of the base assembly shown in FIG. 3.

Referring to FIG. 1 through FIG. 6, the present invention discloses a flexible mobile holder, comprising a base assembly 10, a support rod 20, and a clamping assembly 30 for clamping an electronic product.

The base assembly 10 includes an upright post 11, a clamping mechanism 12, and a movable seat 13.

An upper end of the upright post 11 has a mounting hole 111. A plurality of first positioning teeth 112 are provided on the inner wall of one end of the mounting hole 111. In this embodiment, the mounting hole 111 passes through the upper and lower end faces of the upright post 11. The plurality of first positioning teeth 112 are located on the inner wall of the upper end of the mounting hole 111. The outer wall of the upright post 11 is formed with external threads 113.

The clamping mechanism 12 is disposed at the lower end of the upright post 11. Specifically, the clamping mechanism 12 includes a fixed clamp arm 121, a movable clamp arm 122, and a locking sleeve 123. The fixed clamp arm 121 is fixedly connected to the lower end of the upright post 11. The movable clamp arm 122 is movably sleeved on the upright post 11. The movable clamp arm 122 is located above the fixed clamp arm 121. A clamp groove 101 is defined between the movable clamp arm 122 and the fixed clamp arm 121. The locking sleeve 123 is movably sleeved on the outside of the upright post 11 and pushes the movable clamp arm 122 to move downward, so that the clamp groove 101 is closed to clamp and retain an external object. In this embodiment, the fixed clamp arm 121 is integrally formed with the upright post 11. The inner wall of the locking sleeve 123 is formed with internal threads 102. The internal threads 102 are threadedly connected to the external threads 113. An annular cap 124 is fixedly connected to the upper end opening of the locking sleeve 123.

The movable seat 13 can be moved up and down and is rotatably disposed in the mounting hole 111. The outer wall of the movable seat 13 is formed with a plurality of second positioning teeth 131 meshing with the first positioning teeth 112 for rotational restriction. The movable seat 13 has an elastic arm 132 that is in tight fit with the inner wall of the mounting hole 111. In this embodiment, the movable seat 13 is movable up and down and extends out of the top of the locking sleeve 123. The movable seat 13 is mounted in the mounting hole 111 from the lower end opening of the mounting hole 111. The upper end of the movable seat 13 extends out of the mounting hole 111. A restricting ring 133 is provided on the movable seat 13. The restricting ring 133 is located beneath the second positioning tooth 131. The restricting ring 133 cooperates with the lower ends of the first positioning tooth 112 to prevent the movable seat 13 from coming out of the mounting hole 111. In addition, the elastic arm 132 extends outward from the lower end of the movable seat 13. The elastic arm 132 includes a plurality of elastic arms that are spaced and arranged circumferentially. The plurality of elastic arms 132 are against the inner peripheral wall of the mounting hole 111, so that the movable seat 13 can be positioned at any axial position of the mounting hole 111. In addition, the annular cap 124 is fitted on the outside of the movable seat 13 and cooperates with the movable seat 13 to prevent dust and other debris from entering the locking sleeve 123. Further, the upper end face of the movable seat 13 is recessed to form a retaining hole 134.

In addition, a restricting tube 14 is inserted into the mounting hole 111. The restricting tube 14 is located below the elastic arm 132 and cooperates with the elastic arm 132 to prevent the movable seat 13 from excessive downward movement to come out of the mounting hole 111. The lower end opening of the mounting hole 111 is sealed with a cover 15. The cover 15 is against the lower end face of the restricting tube 14 to hold the restricting tube 14. The restricting tube 14 is a metal round tube.

The support rod 20 is a flexible tube. One end of the support rod 20 is connected to the base assembly 10. The support rod 20 can be bent and deformed at any angle and shaped at any position. The specific structure and principle of the support rod 20 are the prior art. The specific structure and principle of the support rod 20 will not be described in detail herein. In this embodiment, one end of the support rod 20 is insertedly connected to the retaining hole 134.

The clamping assembly 30 is connected to the other end of the support rod 20. The specific structure and principle of the clamping assembly 30 are prior art. The specific structure and principle of the clamping assembly 30 are not described in detail herein.

The use of this embodiment is described in detail as follows:

When in use, first, the locking sleeve 123 is rotated in a forward direction to move the locking sleeve 123 upwards, so as to open the clamp groove 101. At this time, the edge of a desktop or external rod can be engaged in the clamp groove 101. Then, the locking sleeve 123 is rotated in a reverse direction to move the locking sleeve 123 downwards. The clamp groove 101 is closed to clamp the edge of the desktop or external rod, etc., thereby completing the installation of the product and the external object. At this time, an electronic product (such as a mobile phone or a tablet computer) can be held on the clamping assembly 30, and the electronic product can be supported by this product.

When a rotational angle is required, first, the movable seat 13 is pressed down to separate the second locating teeth 131 from the first locating teeth 112. Then, the movable seat 13 can be rotated arbitrarily. When the rotation reaches the required angle, the movable seat 13 is released to move up, and the second positioning teeth 131 is engaged with the first positioning teeth 112 again, so that the movable seat 13 is positioned.

The feature of the present invention is that the movable seat can be moved up and down and is rotatably disposed in the mounting hole. The support rod is fixed to the movable seat, so that the support rod can be rotated and adjusted at any angle. Besides, the second positioning teeth mesh with the first positioning teeth for rotational restriction, such that the support rod can be positioned at any angle. There is no need to rely on the twisting and deformation of the support rod for adjusting an angle. The adjustable angle range is large, meeting the needs of use. It is convenient for use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A flexible mobile holder, comprising a base assembly, a support rod, and a clamping assembly for clamping an electronic product; one end of the support rod being connected to the base assembly; the clamping assembly being connected to another end of the support rod; the base assembly including an upright post, a clamping mechanism, and a movable seat; an upper end of the upright post having a mounting hole, a plurality of first positioning teeth being provided on an inner wall of one end of the mounting hole; the clamping mechanism being disposed at a lower end of the upright post; the movable seat being movable up and down and rotatably disposed in the mounting hole, an outer wall of the movable seat being formed with a plurality of second positioning teeth meshing with the first positioning teeth for rotational restriction, the movable seat having an elastic arm that is in tight fit with the inner wall of the mounting hole.

2. The flexible mobile holder as claimed in claim 1, wherein the clamping mechanism includes a fixed clamp arm, a movable clamp arm and a locking sleeve, the fixed clamp arm is fixedly connected to the lower end of the upright post; the movable clamp arm is movably sleeved on the upright post, the movable clamp arm is located above the fixed clamp arm, a clamp groove is defined between the movable clamp arm and the fixed clamp arm; the locking sleeve is movable up and down on an outside of the upright post and pushes the movable clamp arm to move downward, and the movable seat is movable up and down and extends out of a top of the locking sleeve.

3. The flexible mobile holder as claimed in claim 2, wherein an outer wall of the upright post is formed with external threads, an inner wall of the locking sleeve is formed with internal threads, and the internal threads are threadedly connected to the external threads.

4. The flexible mobile holder as claimed in claim 2, wherein the fixed clamp arm is integrally formed with the upright post.

5. The flexible mobile holder as claimed in claim 2, wherein the mounting hole passes through upper and lower end faces of the upright post, the plurality of first positioning teeth are located on an inner wall of an upper end of the mounting hole, the movable seat is inserted in the mounting hole from a lower end opening of the mounting hole, and an upper end of the movable seat extends out of the mounting hole.

6. The flexible mobile holder as claimed in claim 5, wherein a restricting ring is provided on the movable seat, the restricting ring is located beneath the second positioning tooth, and the restricting ring cooperates with lower ends of the first positioning tooth.

7. The flexible mobile holder as claimed in claim 5, wherein the elastic arm extends outward from a lower end of the movable seat, the elastic arm includes a plurality of elastic arms that are spaced and arranged circumferentially, and the plurality of elastic arms are against an inner peripheral wall of the mounting hole.

8. The flexible mobile holder as claimed in claim 7, wherein a restricting tube is inserted into the mounting hole, and the restricting tube is located below the elastic arm and cooperates with the elastic arm.

9. The flexible mobile holder as claimed in claim 8, wherein the lower end opening of the mounting hole is sealed with a cover, and the cover is against a lower end face of the restricting tube.

10. The flexible mobile holder as claimed in claim 2, wherein an annular cap is fixedly connected to an upper end opening of the locking sleeve, the annular cap is fitted on an outside of the movable seat and cooperates with the movable seat.

\* \* \* \* \*